March 18, 1952     W. T. LEETE     2,589,410
VEHICLE DIRECTIONAL SIGNAL SYSTEM
Filed April 23, 1948
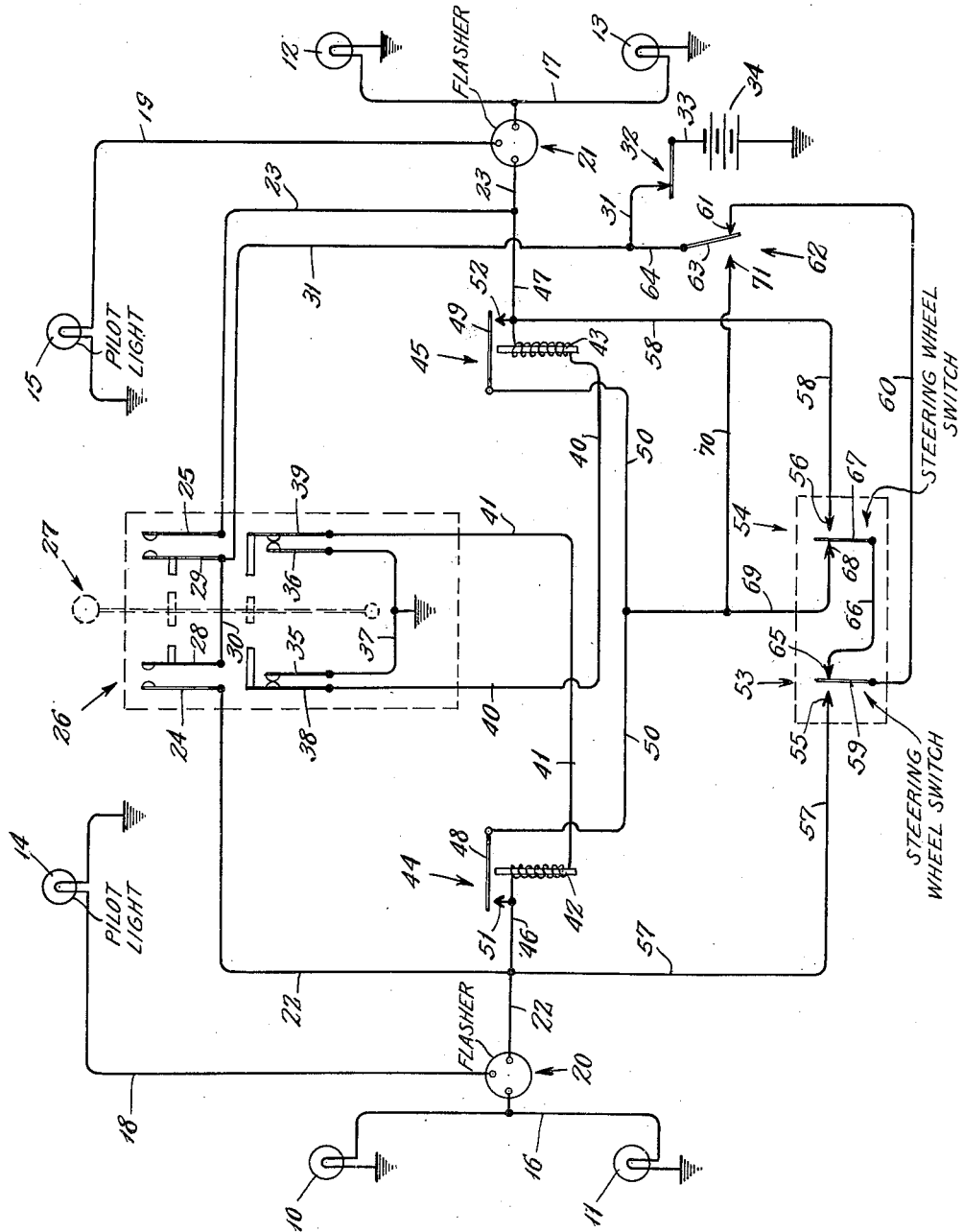
INVENTOR.
William T. Leete
BY
Johnson and Kline
ATTORNEYS Patented Mar. 18, 1952

2,589,410

UNITED STATES PATENT OFFICE 2,589,410

VEHICLE DIRECTIONAL SIGNAL SYSTEM

William T. Leete, Nichols, Conn., assignor to E. W. Carpenter Manufacturing Company, Bridgeport, Conn., a corporation of Connecticut Application April 23, 1948, Serial No. 22,759

14 Claims. (Cl. 177—337)

This invention relates to directional signal systems for use with vehicles, and more particularly to semi-automatic signal systems wherein the signals are automatically shut off after the vehicle has turned the corner.

In the past a number of semi-automatic signal systems have been proposed for vehicles, these systems requiring manual operation to switch on the signals, and responding to turning of the steering wheel to switch off the signals after the vehicle has negotiated the turn. In some systems of this type the manually operable switch which is provided for switching on the signals, is of the momentary contact type, the switch returning to open circuit position immediately upon removal of operating pressure. One such organization has relays having holding circuits to maintain the energization of the signals after the manually operable switch is returned to open circuit position. While this particular arrangement, which is quite advantageous in that it does not require return of the manually operable switch member to neutral position by some mechanism responding to steering of the vehicle, operates satisfactorily where signal units of the non-flashing type are employed, it is incapable of use with flashing-type signals, since the interruption of the signal circuit by a flasher would result in the relay holding circuit being broken, and would cause a shut off of the signals prior to the turn being completed.

An object of the present invention is to provide an improved semi-automatic directional signal system having a momentary-contact manual switch and having holding relays, which system is operable with either steady or flasher-type signals, without disturbing its proper and intended functioning.

Another object of the invention is to provide an improved signal system as above, but which is also extremely simple and economical in construction, and reliable in use at all times.

A further object of the invention is to provide an improved signal system as characterized above, and having means whereby it may be readily changed from the semi-automatic to non-automatic operation at any time, thus enabling the system to be continued in use if the automatic portion should for some reason be rendered inoperative.

A still further object of the invention is to provide an improved directional signal system having the above characteristics, and which is operative to correct a wrongly given signal by the operator merely again actuating the switch in a manner to give the correct signal or, if the wrongly-given signal is not corrected by manual operation of the switch, to correct the defect by the initial turning of the steering wheel, which will deenergize the wrong signal and simultaneously energize the correct signal.

In accomplishing the above objects I provide according to the invention, a novel signal control circuit having holding relays the coils of which are energized by actuation of a manually operable switch, the relay coils however being independent of the signal circuits and being so controlled that the signal circuits may have flashers incorporated in them to cause intermittent energization of the signal bulbs. The relay coils and holding circuits are also energized through series-connected switches which are actuated individually in response to turning of the steering wheel of the vehicle to the left or right, these series-connected switches having additional contacts which connect respectively with the signal units and flashers. Prior to the steering wheel being turned, the signal units are maintained in an energized condition after their initial energization by means of the holding circuits of the relays, and immediately upon the steering wheel being turned, the holding circuits will be disconnected and the signal units energized through other auxiliary circuits, connected to the additional contacts of the steering wheel switches. Since a relay coil is not at any time series-connected with a signal unit and flasher, the intermittent energization of the signal bulb will not affect the holding circuit of the relay to disconnect the bulb; and once the steering wheel has been turned, the signal bulb and flasher will be direct-connected for energization through the additional or auxiliary contact of one of the steering wheel switches, so that in either case, the use of flashers will not disrupt the operation of the system.

The manually operable switch of the present improved system may have auxiliary contacts connected with the relay coils and so arranged that, should a wrong signal be initially given, this may be corrected by reverse operation of the manual switch, whereupon the wrongly energized relay coil will be deenergized to extinguish the signal units incorrectly lighted.

A simple selector switch is provided to cut out the series-connected steering wheel switches whereby the signal system is rendered fully non-automatic in operation, and therefore if any damage or injury occurs to the steering wheel switches, the signal system may still be operated.

Other features and advantages will hereinafter appear.

In the accompanying drawings the single figure is a schematic circuit diagram of the improved directional signal system of the invention.

As shown, my improved signal system comprises a pair of signal bulbs 10 and 11 for indicating a left turn of the vehicle at the front and rear thereof respectively, and a second pair of signal bulbs 12 and 13 at the front and rear respectively of the vehicle for indicating a right turn.

Associated with the signal bulbs 10 and 11 is a left pilot light or bulb 14, and associated with the signal bulbs 12 and 13 is a right pilot light or bulb 15. Each of the bulbs 10 through 15 has one terminal grounded as shown, and the other terminals of the bulbs 10 and 11 are connected together by a wire 16, the other terminals of the bulbs 12 and 13 being connected together by a wire 17. The ungrounded terminals of the pilot bulbs 14 and 15 are respectively connected by wires 18 and 19 with flashers 20 and 21 which are also respectively connected with the wires 16 and 17. The flashers 20 and 21 have input terminals connected by wires 22 and 23 respectively with contacts 24 and 25 of a manually operable switch 26 which has a hand lever or button 27 (indicated in dotted outline). The switch 26 has individually movable contacts 28 and 29 cooperable respectively with the contacts 24 and 25, the contacts 28 and 29 being electrically connected together by a wire 30, and one or the other of the contacts being actuated in response to movement of the lever 27 in one direction or the other. The contacts 28 and 29 are normally separated from the contacts 24 and 25, as by any suitable spring means, and the wire 30 joining the contacts is connected with a wire 31 leading to a master on-off switch 32 which is in turn connected by a wire 33 with one terminal of the vehicle battery 34, the other terminal of the latter being grounded as shown.

The manually operable switch 26 has a pair of contacts 35 and 36 connected together by a wire 37 which is grounded, the said contacts being cooperable, and normally in engagement respectively with, contacts 38 and 39 adapted to be actuated individually in response to opposite movements of the switch lever 27.

The switch 26 is so constructed that when the lever 27 is moved to the right as viewed in the figure the contacts 29 and 25 will be made to engage each other and the contacts 36 and 39 made to disengage, and when the lever is moved to the left the contacts 28 and 24 will be made to engage each other and the contacts 38 and 35 made to disengage. The contacts 38 and 39 are connected by wires 40 and 41 respectively with coils 43 and 42 of relays 45 and 44, the remaining terminals of the coils 42 and 43 being respectively connected by wires 46 and 47 with the wires 22 and 23. The relays 44 and 45 have armatures 48 and 49 respectively, electrically connected together by a wire 50, the said armatures being cooperable with and normally disengaged from relay contacts 51 and 52 which are respectively connected to the wires 46 and 47.

Semi-automatic operation of the improved signal control system of this invention is accomplished by a pair of single-pole double-throw switches 53 and 54 having contacts 55 and 56 respectively connected by wires 57 and 58 with the wires 46 and 47. The switch 53 has a blade 59 connected by a wire 60 with a contact 61 of a single-pole double-throw switch 62 the blade 63 of which is connected by a wire 64 with the wire 31 of the system. The blade 59 of the switch 53 is cooperable with and normally engages a switch contact 65 connected by a wire 66 with the blade 67 of the switch 54, and the said blade 67 is normally in engagement with a contact 68 connected by a wire 69 with the wire 50. A wire 70 connects the wire 69 with the remaining contact 71 of the switch 62.

The single-pole double-throw switches 53 and 54 are made to be responsive to turning of the steering wheel, and this may be accomplished in any suitable manner well-known in the art whereby turning of the steering wheel to the right causes the switch blade 67 to disengage the contact 68 and to engage the contact 56, and turning of the steering wheel to the left causes the blade 59 to disengage the contact 65 and to engage the contact 55.

The single-pole double-throw switch 62 is provided to adapt the system for either semi-automatic operation (effected by the switch blade 63 being in the position shown), or for manual operation (effected by the switch blade 63 being moved into engagement with the contact 71).

The operation of the present improved directional signal system is as follows: The master switch 32 is normally kept closed. If the manual-automatic switch 62 is in the position indicated, wherein the system is connected for semi-automatic operation, moving of the manually operable switch lever 27 to the right will cause the relay coil 43 of the relay 45 to be energized, current flowing through the wires 33, 31, 23, 47, 40 and 37, which may be easily traced. Such energization will cause the relay armature 49 to engage the contact 52, whereupon the right signal bulbs 12 and 13, and also the pilot bulb 15 will be energized, such energization being effected through the wires 17, 19, 23, 47, 50, 69, 66, 60, 64, 31 and 33, as may be readily traced on the diagram. As long as the steering wheel of the vehicle is not turned from straight-ahead position, the right signal bulbs 12 and 13 will be flashed on and off by the flasher 21, energization being maintained through the holding circuit of the relay 45, which includes the relay armature 49 and contact 52. It will be noted that the relay coil 43 is not energized through the flasher 21 and signal bulbs 12 and 13, but instead through a shunt circuit around the flasher and bulbs, comprising the wires 40 and 37, and therefore the intermittent contact established by the flasher will not affect the energization of the coil 43 to cause it to release the armature 49.

If, instead of the switch lever 27 being moved to the right it is moved to the left, the left signal bulbs 10 and 11 will be energized through the flasher 20, and the relay 44 will be energized, all in a manner similar to that described immediately above, the relay coil 42 receiving current through the ground and through a shunt circuit comprising the wires 37 and 41 so that the flasher 20 does not deenergize the coil 42 and release the relay armature 48.

It will be understood that the switch lever 27 automatically returns to centralized position upon removal of pressure therefrom; however, this will not result in either the left or right signal bulbs, as the case may be, being deenergized since one or the other of the relays will have its energization maintained by its associated holding circuit comprising the relay armature and relay contact.

Considering the case where a right signal has been initiated by movement of the switch lever 27 to the right, as soon as the steering wheel of the vehicle is turned to the right to cause the vehicle to make a right turn, the blade 67 of the switch 54 will be separated from the switch contact 68 and will become engaged with the switch contact 56. This will momentarily deenergize the relay 45, but the relay will again be energized through the wire 58, as will also the right signal bulbs 12, 13 and the pilot bulb 15 together with the flasher 21. It will be seen that such energization is effected through the wires 33, 31, 64, 60, 66, 58 and thence through the relay, flasher and signal bulbs to the ground side of the circuit. Therefore, the energization of the right signal bulbs 12, 13 and the right pilot light 15 will be maintained. Upon the steering wheel being straightened out after the corner has been turned, the switch blade 67 will return to the position shown, in engagement with the switch contact 68. This will break the circuit through the signal bulbs and flasher and through the relay coil 43; however, reenergization of the relay will not be established, upon the engagement of the blade 67 with the contact 68, since the relay armature 49 will be separated from the contact 52 when the relay is deenergized. It will be seen that energization of the relay 45 must be established initially either through the wires 47 or 68, and cannot be initially established through the wire 50.

Considering the case where a left turn is indicated by shifting the switch lever 27 to the left, the initial turning of the steering wheel of the vehicle to the left will separate the switch blade 59 from the contact 65 and will cause the blade to engage the contact 55. This will momentarily deenergize the relay 44 and the bulbs 10 and 11, and will then reenergize the relay and the bulbs, and such energization will be maintained until the steering wheel is again straightened out, in the manner described in detail immediately above in connection with the right hand turn.

It will be noted that in each instance the right or left signal bulbs can be intermittently energized through the associated flashers without disrupting the automatic shut off function, or the signal function of the system. If desired, the flashers 20 and 21 may be omitted, and the system then made to provide a steady energization of the signal bulbs.

In the event that the steering wheel switches 53 and 54 are rendered inoperative due to damage or other causes, the signal system of the present invention may be quickly converted for manual operation by merely throwing the switch blade 63 to the left from the position shown.

If the operator should give a wrong turn signal by incorrectly shifting the switch lever 27, the wrong signal may be extinguished and a correct signal given by merely actuating the switch lever 27 in the correct direction. Such correct actuation of the switch lever separates the contacts of one of the auxiliary pairs 35, 38 or 36, 39, and such separation deenergizes the incorrectly energized relay and the signal bulbs associated therewith.

An important advantage of the signal system of the present invention is as follows: If the operator of a vehicle should energize the right signals and then pull to the curb without thereafter completely straightening out the steering wheel, the right signal lights will remain energized. Now, when the operator desires to energize the left signals he may do so, the right signals meanwhile remaining on. As the vehicle pulls away from the curb, the straightening and turning of the steering wheel to the left will extinguish the right signals, and after the steering wheel has again straightened out the left signals will become extinguished. This feature of the present improved signal system is extremely advantageous, for example, in connection with omnibuses and the like.

The manually operable switch 26 of the system may be simplified by the omission of the contacts 35, 36, 38 and 39 if desired, in which event the wires 40 and 41 would be joined together and grounded. If this is done, the system will not be operative to shut off a wrongly indicated signal by actuating the switch 27 in the correct direction, but instead upon the switch lever 27 being shifted in the correct direction both the left and right hand signals of the system will remain in operation, thereby indicating that a mistake was made by the operator in initially incorrectly operating the switch lever 27.

However, to correct a wrongly given signal in this simplified organization, the master switch 32 may be momentarily opened, this switch being preferably placed in a convenient location for this purpose.

The provision of the manual-automatic switch 62 is optional, and this switch may be omitted if desired and the signal system made permanently semi-automatic by permanently connecting together with wires 60 and 64, and by discarding the wire 70.

Variations and modifications may be made within the scope of this invention and portions of the improvements may be used without others.

I claim:

1. In a vehicle having an electric power supply, a directional signal system comprising left and right electric signals; means including a self-restoring single-pole double-throw switch device operable in response to manual pressure and adapted to restore itself upon removal of said pressure, for connecting one or the other of the signals directly to the power supply for energization therefrom, said means being so constituted that restoring of said switch device after removal of the manual pressure therefrom automatically disconnects said signal; and means electrically connected to the single-pole double-throw switch device and controlled by said device and by the steering mechanism, and including solely two single-pole relays and electric circuits connected thereto providing pairs of shunt paths around the single-pole double-throw switch device, one path or the other of one pair energizing said one signal or the other concurrently with energization of the signal by said switch device and maintaining such energization regardless of disconnecting of the signal by the switch device, and one path or the other of the other pair maintaining such energization regardless of moving of the steering mechanism from straight-ahead position, said means responding to straightening of the steering mechanism by discontinuing a shunt path of the other pair, thereby to deenergize said signal.

2. In a vehicle having an electric power supply, a directional signal system comprising left and right electric signals; means including a switch device operable in response to manual pressure and adapted to restore itself upon removal of said pressure, for connecting one or the other of the signals directly to the power supply for energization therefrom, said means being so constituted that restoring of said switch device after removal of the manual pressure therefrom automatically disconnects said signal; and means controlled by the steering mechanism and including electric circuits, for energizing one signal or the other concurrently with energization of the signal by said switch device, said means providing four shunt paths around the switch device, two of said paths maintaining such energization regardless of disconnecting of the signal by the switch device and the other two maintaining such energization regardless of moving of the steering mechanism from straight-ahead position, and said means including a second switch device comprising two single-pole double-throw switches connected with said circuits and controlling said shunt paths, said second switch device being actuated directly by said steering mechanism to open a shunt path of said other two paths in response to said mechanism straightening out after the vehicle has turned a corner, thereby to deenergize said signal.

3. In a vehicle having an electric power supply, a directional signal system comprising left and right electric signals; means including a switch device operable in response to manual pressure and adapted to restore itself upon removal of said pressure, for connecting one or the other of the signals directly to the power supply for energization therefrom, said means being so constituted that restoring of said switch device after removal of the manual pressure therefrom automatically disconnects said signal; and means controlled by the steering mechanism, including relays and relay holding circuits connected with the relays, for energizing one signal or the other concurrently with energization of the signal by said switch device, said means providing four shunt paths around the switch device, two of said paths maintaining such energization regardless of disconnecting of the signal by the switch device, and the other two maintaining such energization regardless of moving of the steering mechanism from straight-ahead position, and said means including a second switch device comprising two single-pole double-throw switches connected with said holding circuits and controlling said shunt paths, said second switch device being actuated directly by said steering mechanism to open a holding circuit in response to said mechanism straightening out after the vehicle has turned a corner, thereby to open a shunt path of said other two paths and deenergize said signal.

4. In a vehicle having an electric power supply, a directional signal system comprising left and right electric signals; means including a switch device operable in response to manual pressure and adapted to restore itself upon removal of said pressure, for connecting one or the other of the signals directly to the power supply for energization therefrom, said means being so constituted that restoring of said switch device after removal of the manual pressure therefrom automatically disconnects said signal; switch means comprising a pair of single-pole double-throw switches, operable in response to movements of the vehicle steering mechanism; means including circuits and a pair of relays connected with said switch means for automatically making an auxiliary connection to energize said one or the other of the signals from the power supply substantially concurrently with energization of the signal by said switch device, said auxiliary connection being maintained until said switch means is actuated by the steering mechanism in moving out of straight-ahead position; and means including a circuit connected with said switch means for making a second auxiliary connection to energize said one or the other of the signals in response to the said actuation of the switch means, the latter breaking the said second auxiliary connection when the steering mechanism returns to straight-ahead position.

5. A directional signal system for vehicles, comprising left and right electric signals for mounting on a vehicle; terminal means for connection to the electric power supply of the vehicle; means, including a switch mechanism operable in response to manual pressure and adapted to restore itself upon removal of said pressure, for making an energizing connection through the terminal means and directly to one or the other of the signals to energize the signal when the terminal means are connected to said supply, said means being so constituted that restoring of said mechanism upon removal of pressure therefrom automatically breaks said connection; means for automatically making an auxiliary energizing connection through the terminal means and one or the other of the signals in response to the making of said first connection when the supply is connected, said auxiliary connection being maintained regardless of breaking of the first connection; switch means adapted for operation in response to movement of the vehicle steering mechanism, for breaking said auxiliary energizing connection when said switch means is actuated as by the steering mechanism moving out of its straight-ahead position; and means, connected with said switch means, for making a second auxiliary connection through the terminal means and one or the other of the signals in response to the said actuation of the switch means, the latter breaking the said second auxiliary connection when actuated as by the steering mechanism straightening out after the vehicle has turned a corner.

6. A directional signal system for vehicles, comprising left and right electric signals for mounting on a vehicle; terminal means for connection to the electric power supply of the vehicle; means, including a single-pole double-throw switch mechanism operable in response to manual pressure and adapted to restore itself upon removal of said pressure, for making an energizing connection through the terminal means and directly to one or the other of the signals to energize the signal when the terminal means are connected to said supply, said means being so constituted that restoring of said mechanism upon removal of pressure therefrom automatically breaks said connection; means, including circuits, including solely two single-pole relays connected with the circuits, and including a switch device connected with said circuits and adapted for operation in response to movement of the vehicle steering mechanism, for automatically making an auxiliary energizing connection through the terminal means and one or the other of the signals in response to the making of said first connection when the supply is connected, said auxiliary connection being maintained regardless of breaking of the first connection and until the said switch device is actuated as by the vehicle steering mechanism moving out of its straight-ahead position; and means including circuits connected with said switch device, for making a second auxiliary connection through the terminal means and one or the other of the signals in response to said actuation of the switch device, said device breaking the second auxiliary connection when actuated as by the steering mechanism straightening out after the vehicle has turned a corner.

7. A directional signal system for vehicles, comprising left and right electric signals for mounting on a vehicle; terminal means for connection to the electric power supply of the vehicle; means, including a switch mechanism operable in response to manual pressure and adapted to restore itself upon removal of said pressure, for making an energizing connection through the terminal means and directly to one or the other of the signals to energize the signal when the terminal means are connected to said supply, said means being so constituted that restoring of said mechanism upon removal of pressure therefrom automatically breaks said connection; means for automatically making an auxiliary energizing connection through the terminal means and one or the other of the signals in response to the making of said first connection when the supply is connected, said auxiliary connection being maintained regardless of breaking of the first connection, and said means including a pair of circuits and a pair of holding relays each having one contact connected to the same one of said circuits, and including a pair of single pole switches adapted for independent operation in response to movement of the vehicle steering mechanism, said switches being connected respectively to said circuits and said auxiliary connection being maintained until one of said switches is actuated as by the vehicle steering mechanism moving out of its straight-ahead position; and means including contacts on said switches cooperable with the poles thereof, and including circuits connected with said switch contacts and with the other relay contacts, for making a second auxiliary connection through the terminal means and one or the other of the signals in response to said actuation of a switch, the latter breaking the second auxiliary connection when actuated as by the steering mechanism straightening out after the vehicle has turned a corner.

8. In a vehicle having an electric power supply, a directional signal system comprising left and right electric signals; a first means, including a switch device operable in response to manual pressure and adapted to restore itself upon removal of said pressure, for connecting one or the other of the signals directly to the power supply for energization therefrom, said means being so constituted that restoring of said switch device after removal of manual pressure therefrom automatically disconnects said signal; a second means, controlled by the steering mechanism and including electric circuits providing pairs of shunt paths around the switch device, one path or the other of one pair energizing said one signal or the other concurrently with energization of the signal by said first means and maintaining such energization regardless of disconnecting of the signal by the first means, and one path or the other of the other pair maintaining such energization regardless of moving of the steering mechanism from straight-ahead position, and said second means responding to straightening of the steering mechanism by opening a path of the other pair, thereby to deenergize said signal; means including a manually operable switch connected with said second means, for rendering a portion of the same inoperative whereby the control effected by the steering mechanism is abolished, and for simultaneously connecting the power supply to another portion of the second means to enable said signal energization to be continually maintained; and means including another manually-operable switch connected with said power supply for opening the circuit thereto whereby the signal is rendered inoperative.

9. In a vehicle having an electric power supply, a directional signal system comprising left and right electric signals; a first means, including a single-pole double-throw switch device operable from a neutral position in either of two senses in response to manual pressure and adapted to restore itself to neutral upon removal of said pressure, for energizing one or the other of the signals directly from the power supply, said means being so constituted that restoring of the switch device to neutral automatically terminates the said energization; a second means electrically connected to and controlled by said single-pole double-throw switch for energizing one signal or the other concurrently with energization of the signal by said first means, and for maintaining signal energization after said termination of energization, said second means including signal energization-controlling electro-responsive devices and control circuits for said devices, closing of which circuits causes the devices to maintain energization of the signal; means responsive to actuation of the vehicle steering mechanism while out of straight-ahead position, for opening a closed control circuit, thereby to deenergize an energized signal; and means actuated concurrently with the single-pole double-throw switch device for opening a control circuit of one electro-responsive device when the single-pole double-throw switch device, after being actuated in one sense, is actuated in the other sense whereby simultaneous energizations of both signals is prevented.

10. In a vehicle having an electric power supply, a directional signal system comprising left and right electric signals; means including a single-pole double-throw selecting switch device operable from a neutral position in either of two senses in response to manual pressure and adapted to restore itself to neutral upon removal of said pressure, for connecting one or the other of the signals directly to the power supply for energization therefrom, said means being so constituted that restoring of the switch device to neutral automatically disconnects said signal; switch means operable in response to movements of the vehicle steering mechanism; means controlled by said single-pole double-throw switch device including solely two single-pole relays and circuits connected with said switch means and single-pole double-throw switch device for automatically making one or another auxiliary connection to energize said one or the other of the signals from the power supply substantially concurrently with energization of the signal by said switch device, said auxiliary connection being maintained until said switch means is actuated by the steering mechanism in moving out of straight-ahead position; means including a circuit connected with said switch means for making either of two second auxiliary connections to energize said one or the other of the signals in response to the said actuation of the switch means, the latter breaking the said second auxiliary connection when the steering mechanism returns to straight-ahead position; and means operable concurrently with said single-pole double-throw switch device for breaking the one first-mentioned auxiliary connection when the switch device, after being actuated in one sense, is actuated in the other sense, thereby to provide for an incorrect signal being deenergized while a correct signal is being energized.

11. In a vehicle having an electric power supply, a directional signal system comprising left and right electric signals; means including a switch device operable in response to manual pressure and adapted to restore itself upon removal of said pressure, for connecting one or the other of the signals directly to the power supply for energization therefrom, said means being so constituted that restoring of said switch device after removal of the manual pressure therefrom automatically disconnects said signal; switch means operable in response to movements of the vehicle steering mechanism; means including circuits connected with said switch means for automatically making one or another auxiliary connection to energize said one or the other of the signals from the power supply substantially concurrently with energization of the signal by said switch device, said auxiliary connection being maintained until said switch means is actuated by the steering mechanism in moving out of straight-ahead position; means including a circuit connected with said switch means for making either of two second auxiliary connections to energize said one or the other of the signals in response to the said actuation of the switch means, the latter breaking the said second auxiliary connection when the steering mechanism returns to straight-ahead position; and means including a second manually operable switch, for disconnecting the power supply from the said connection-maintaining means without disturbing connection of said supply to the signals through said switch device, thereby to render the signals inoperative except in response to actuation of the switch device.

12. A directional signal system for vehicles, comprising left and right electric signals for mounting on a vehicle; terminal means for connection to the electric power supply of the vehicle; means including a selecting switch mechanism operable in either of two senses from a neutral position in response to manual pressure and adapted to restore itself to neutral upon removal of said pressure, for making an energizing connection through the terminal means and directly to one or the other of the signals to energize the signal when the terminal means are connected to said supply, said means being so constituted that restoring of said switch mechanism upon removal of pressure therefrom automatically breaks said connection; means for automatically making one or another auxiliary energizing connection through the terminal means and one or the other of the signals in response to the making of said first connection when the supply is connected, said auxiliary connection being maintained regardless of breaking of the first connection; switch means adapted for operation in response to movement of the vehicle steering mechanism, for breaking said auxiliary energizing connection when said switch means is actuated as by the steering mechanism moving out of its straight-ahead position; means connected with said switch means for making either of two second auxiliary connections through the terminal means and one or the other of the signals in response to said actuation of the switch means, the latter breaking the said auxiliary connection when actuated as by the steering mechanism straightening out after the vehicle has turned a corner; and a second switch means operable concurrently with said switch mechanism, for breaking the one first-mentioned auxiliary connection when the switch mechanism, after being actuated in one sense, is actuated in the other sense, thereby to provide for an incorrect signal being deenergized while a correct signal is being energized.

13. In a vehicle having an electric power supply, a directional signal system comprising left and right electric signals; a first means, including a single-pole double-throw selecting switch device operable from a neutral position in either of two senses in response to manual pressure and adapted to restore itself to neutral upon removal of said pressure, for connecting one or the other of the signals directly to the power supply for energization therefrom, said means being so constituted that restoring of the switch device to neutral automatically disconnects said signal; a second means, controlled by the single-pole double-throw switch device and by the steering mechanism and including electric circuits providing pairs of shunt paths around the switch device, one path or the other of one pair energizing said one signal or the other concurrently with energization of the signal by said first means and maintaining such energization regardless of disconnecting of the signal by the first means, and one path or the other of the other pair maintaining such energization regardless of moving of the steering mechanism from straight-ahead position, said second means responding to straightening of the steering mechanism by opening a path of said other pair, thereby to deenergize said signal; and means interposed in a separate electrical circuit from the single-pole double-throw switch device and operable concurrently with said switch device, for deenergizing an initially energized signal when the switch device, after being actuated in a wrong sense for a contemplated turn, is operated in a right sense.

14. In a vehicle having an electric power supply, a directional signal system comprising left and right electric signals; a first means, including a single-pole double-throw switch device operable in response to manual pressure and adapted to restore itself upon removal of said pressure, for fully energizing one or the other of the signals directly from the power supply, said means being so constituted that restoring of the switch device upon removal of manual pressure therefrom automatically terminates the said energization; a second means controlled by said single-pole double-throw switch device for energizing one signal or the other in response to making of said signal-energizing connection by said first means, said second means maintaining energization of a signal after termination of energization by the switch device; means for rendering inoperative said second means in response to moving of the steering mechanism from straight-ahead position, and for re-energizing the signal from said supply in response to said movement; and means responsive to straightening of the steering mechanism for rendering inoperative said last-named means, thereby to finally deenergize said signal.

WILLIAM T. LEETE.

REFERENCES CITED

The following references are of record in the file of this patent:

UNITED STATES PATENTS

| Number | Name | Date |
| --- | --- | --- |
| 1,620,456 | Gallus et al. | Mar. 8, 1927 |
| 1,634,347 | Tockwin | July 5, 1927 |
| 1,763,465 | Hild | June 10, 1930 |
| 1,973,299 | Swartwout | Sept. 11, 1934 |
| 2,064,735 | Curtiss | Dec. 15, 1936 |
| 2,238,394 | Murray, Jr. | Apr. 15, 1941 |
| 2,268,545 | Crider | Jan. 6, 1942 |